United States Patent [19]
Zawoysky

[11] Patent Number: 5,432,391
[45] Date of Patent: Jul. 11, 1995

[54] CONFORMABLE DYNAMOELECTRIC MACHINE FIELD DISTANCE BLOCKS AND METHODS OF INSTALLATION

[75] Inventor: Ronald J. Zawoysky, Clifton Park, N.Y.

[73] Assignee: General Electric Company, Schenectady, N.Y.

[21] Appl. No.: 210,971

[22] Filed: Mar. 21, 1994

[51] Int. Cl.⁶ .............................................. H02K 3/46
[52] U.S. Cl. ..................................... 310/270; 310/42; 310/45; 310/201; 310/271
[58] Field of Search ................. 310/260, 270, 45, 201, 310/43, 58, 59, 60 A, 65, 271, 42, 261; 29/598

[56] References Cited

U.S. PATENT DOCUMENTS

| | | | |
|---|---|---|---|
| 2,425,997 | 8/1947 | Criner et al. | |
| 2,786,951 | 3/1957 | Morgan | |
| 2,833,944 | 5/1958 | Willyoung | |
| 3,449,609 | 6/1969 | Thiessen et al. | 310/260 |
| 3,454,805 | 7/1969 | Fromm et al. | 310/270 |
| 4,143,290 | 3/1979 | Mizukami et al. | |
| 4,335,324 | 6/1982 | Fujoika et al. | |
| 4,363,981 | 12/1982 | Laskaris | 310/45 |
| 4,533,580 | 8/1985 | Otty | 310/45 |
| 4,543,503 | 9/1985 | Kaminski et al. | |
| 4,656,382 | 4/1987 | Moore et al. | 310/270 |
| 4,709,177 | 11/1987 | Kaminski | |
| 4,814,655 | 3/1989 | Kaminski | |
| 4,831,303 | 5/1989 | Rowe et al. | 310/260 |
| 5,252,880 | 10/1993 | Kazmierczak et al. | 310/260 |

*Primary Examiner*—R. Skudy
*Attorney, Agent, or Firm*—Nixon & Vanderhye

[57] ABSTRACT

Conformable distance blocks assemblies (24, 26) are provided for spacing adjacent end windings (20, 22) in a dynamoelectric machine. Each block assembly includes a pair of relatively hard blocks (28, 38) straddling a deformable spacer (32). The blocks and spacer are wrapped with an electrically insulating tape (34, 48) having an adhesive along an interior face for maintaining the blocks and spacer in assembled condition with a tab (36, 50) on the end of the tape. Generally rectilinear blocks (28) are employed for axial distance block assemblies, while the circumferential block assembly is comprised of tapered blocks (38) forming a wedge assembly. In installation, the assemblies are disposed between adjacent end windings, resiliently deforming the spacer, the tab being adhesively secured to the outermost lamination of the end windings. The spacer is also impregnated with a resin such that, upon curing, a rigid distance block assembly is provided to maintain adjacent end windings spaced from one another.

4 Claims, 3 Drawing Sheets

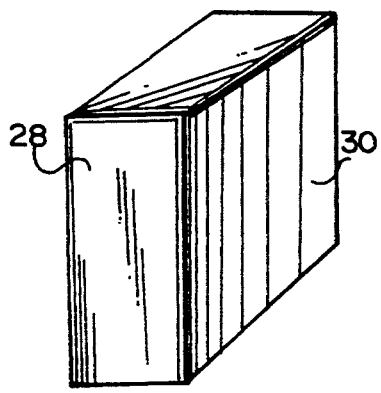
FIG. 3
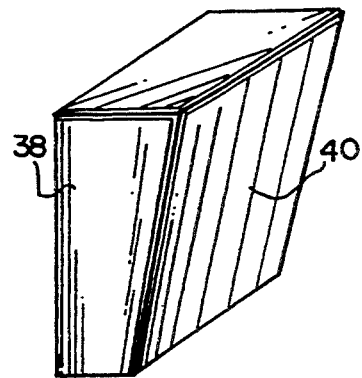
FIG. 4
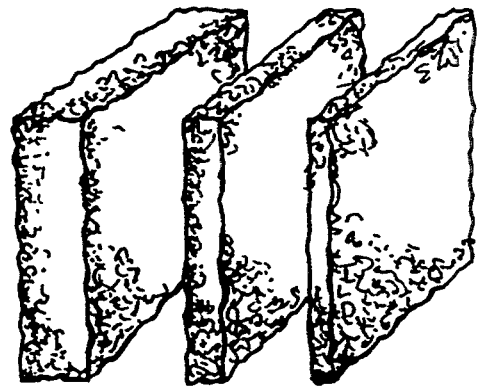
FIG. 5
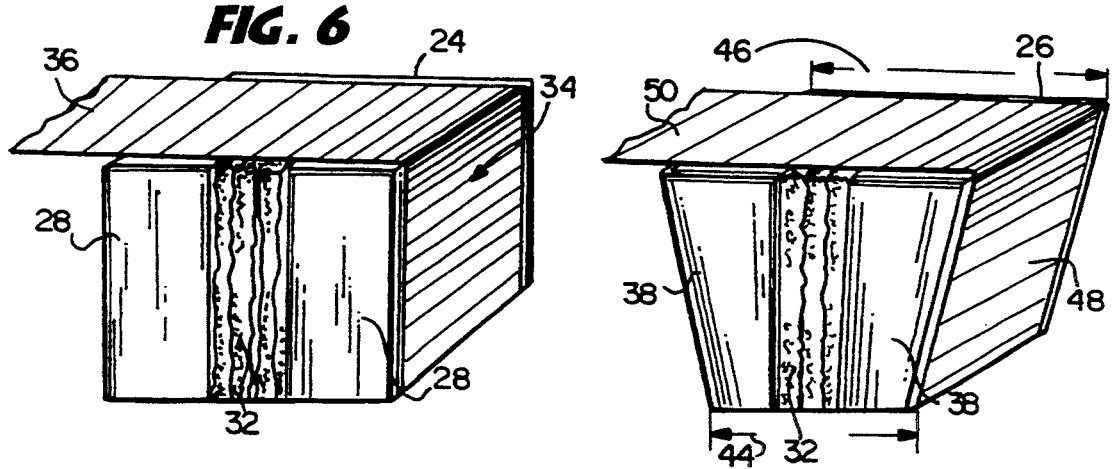
FIG. 6
FIG. 7

CONFORMABLE DYNAMOELECTRIC MACHINE FIELD DISTANCE BLOCKS AND METHODS OF INSTALLATION

The present invention relates to distance blocks for spacing the end windings of a dynamoelectric machine and particularly relates to conformable distance blocks for spacing the end turns and conductor bars of the end windings of a dynamoelectric machine and methods of installation of the distance blocks.

TECHNICAL FIELD

In dynamoelectric machines, distance blocks are typically provided for positively spacing the end windings of the rotor. For example, on the rotors of generators, axial distance blocks are conventionally provided between the end turn portion of the field windings, while circumferential blocks are provided between the end portions of the axial conductor bars of the field windings. As used herein, the term end turns is used to denote the circumferentially extending end turn portions of the field winding, while the term conductor bars is used to denote the portions of the field windings projecting axially from the rotor.

BACKGROUND

Conventionally, distance blocks are formed of hard electrically insulating materials which involve extensive machining and custom fitting during assembly of the end windings. For example, an installer may obtain a block of the approximate size for installation between adjacent end windings and manually fits the block between those end windings. If the block is too thick, the installer grinds the block to the appropriate thickness. If the block is too thin, shims are typically employed to increase the thickness of the block to the size necessary to maintain the adjacent end windings spaced a predetermined distance from one another. It will also be appreciated that the circumferential distance blocks are necessarily tapered. This further complicates the custom fitting of the blocks to the size necessary to space the conductor bars from one another. Consequently, conventional axial and circumferential distance blocks require significant machining and labor for their proper installation, either at the factory or in the field. This adds significant costs to the dynamoelectric machine or its maintenance in the field, for example, in the case of a field rewinding of the rotor. In short, conventional distance blocks and their installation require significant time and effort, and hence cost, to manufacture and install, both initially and in the field.

DISCLOSURE OF THE INVENTION

According to the present invention, there is provided conformable distance blocks which can be readily manufactured and installed, either at the factory or on-site, in a manner which minimizes or eliminates the foregoing and other problems and provides novel and improved distance blocks having various advantages in construction and installation. For example, the previously believed necessary machining is eliminated. Also, the present invention employs a taping system to bind the block assemblies to one another and to lock the assemblies to the end windings to prevent the blocks from moving. Particularly, the present invention provides, in a preferred embodiment, a pair of blocks, either axial or circumferential, formed of an electrically insulating solid material and a spacer formed preferably of electrically insulating deformable material for disposition between the blocks. By providing spacers of various thicknesses, for example, on the order of $\frac{1}{8}''$, $\frac{1}{4}''$, $\frac{3}{8}''$, an approximate spacer or spacers can be selected and disposed between the pair of blocks to form a distance block assembly which can be adjustably fit between adjacent end windings.

More particularly, to provide axial distance block assemblies for spacing the end turns from one another, each distance block includes a pair of generally rectilinear blocks having a constant thickness. A deformable spacer or spacers is provided between the rectilinear blocks to provide a distance block assembly of predetermined thickness. For the circumferential distance block assemblies, a pair of solid blocks, each having a tapered outer surface, is provided. With a selected spacer or spacers disposed between the pair of tapered blocks, a generally wedge-shaped circumferential distance block assembly is provided of a predetermined thickness. In both cases, an electrically insulating tape is wound about the block assembly, leaving a loose end for attachment to an end winding. When disposing the block assemblies between adjacent end windings, the spacer is deformed, i.e., resiliently compressed, between adjacent end windings. After disposition between the pair of blocks, the deformable spacer tends to expand and press fits the block assembly between the end windings. Machining of the block to obtain an appropriate fit is thus entirely eliminated. Also, the loose end of the tape preferably has an adhesive on one face for securing the block to one of the end windings to prevent the block assembly from moving, for example, circumferentially in the case of the axial block assemblies and axially in the case of the circumferential block assemblies. It will be appreciated that while in the preferred embodiment, a pair of solid blocks are used in each block assembly to straddle the deformable spacer, a single hard block may be used in conjunction with a deformable spacer with the single block and spacer engaging the end adjacent windings, respectively.

In a preferred form of the present invention, a resin is impregnated into the spacer material. The resin may be of the heat or time-cured type. Thus, after installation of the distance block assemblies between adjacent end windings, the resin cures or is cured to form a solid distance block assembly of the appropriate thickness.

In a preferred embodiment of the present invention, there is provided in a dynamoelectric machine having a rotor with end windings, a plurality of conformable distance block assemblies for spacing the end windings relative to one another, each distance block assembly including at least one block formed of an electrically insulating solid material and a spacer disposed on one side of the block and formed of a deformable material, the assembly being located between adjacent end windings of the rotor with the deformable material conformed to fit the spacer and the one block to the space between the adjacent end windings.

In a further preferred embodiment of the present invention, there is provided in a dynamoelectric machine having a rotor with end windings, a plurality of conformable distance block assemblies for spacing the end windings relative to one another, each distance block assembly including a pair of blocks formed of an electrically insulating solid material and a spacer disposed between the pair of blocks and formed of a deformable material, the assembly being located between adjacent end windings of the rotor with the deformable material conformed to fit the spacer and pair of blocks to the space between the adjacent end windings.

In a still further preferred embodiment of the present invention, there is provided a method of installing distance block assemblies between adjacent end windings in a rotor of a dynamoelectric machine comprising the steps of providing a pair of blocks formed of electrically insulating solid material, disposing a spacer formed of an electrically insulating deformable material between the pair of blocks to provide a distance block assembly of predetermined thickness and locating the distance block assembly between an adjacent pair of end windings by deforming the deformable spacer to fit the pair of blocks and spacer in the space between the adjacent pair of end windings to maintain the spacing therebetween.

Accordingly, it is a primary object of the present invention to provide novel and improved conformable distance block assemblies for the rotor end windings of dynamoelectric machines and methods of installation thereof.

BRIEF DESCRIPTION OF THE DRAWINGS

FIG. 3 is a perspective view of a single block of the axial distance block assembly;

FIG. 4 is a perspective view of a single circumferential block of the circumferential distance block assemblies;

FIG. 5 is a perspective view of deformable spacers provided in different sizes for use with the distance block assemblies hereof;

FIG. 6 is a perspective view of an axial distance block assembly illustrating the tape wrap and loose end of the tape;

FIG. 7 is a view similar to FIG. 5 but illustrating the circumferential distance block assembly.

BEST MODE FOR CARRYING OUT THE INVENTION

Figure 1:
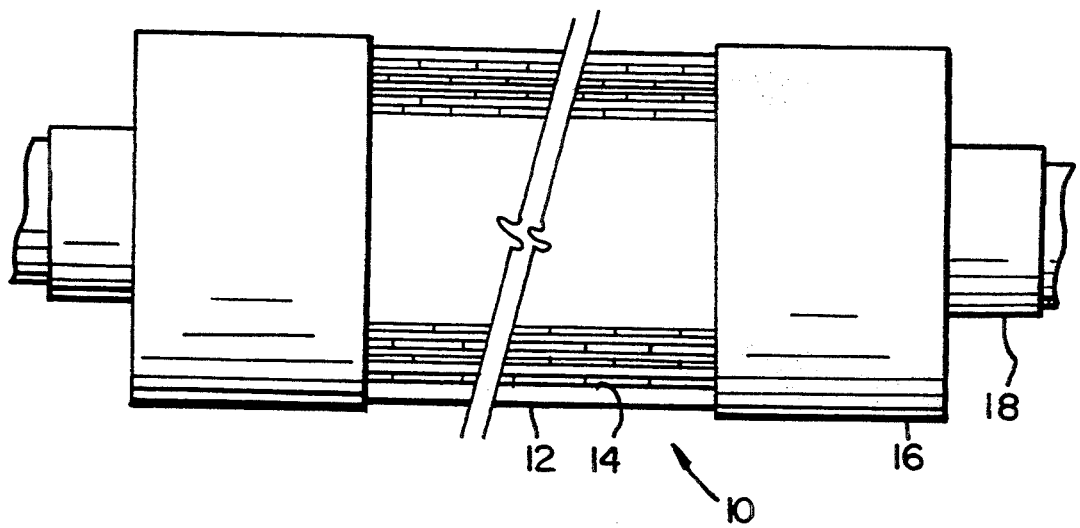
FIG. 1 is a fragmentary side elevational view of a dynamoelectric machine in which rotor end windings are provided with conformable distance block assemblies according to the present invention.

Referring now to the drawings, particularly to FIG. 1, there is illustrated a dynamoelectric machine, for example, a generator, generally designated 10, having a rotor 12 with end bearings 18 and rotor windings in grooves 14 along the rotor surface. The rotor windings include end windings, not shown, but closed by end retaining rings 16. It will be appreciated that the rotor windings include laminated conductor bars disposed in radially extending circumferentially spaced grooves 14 and which conductor bars extend axially to form axially extending portions of the axial field winding. The conductor bar portions of the axial field end windings are secured, for example, by brazing, to circumferentially extending end turn portions of the field windings. As indicated previously, the portions of the conductor bars extending axially from the rotor are hereafter called conductor bar end windings or conductor bars, while the circumferentially extending portions of the end windings are called end turns.

Figure 2:
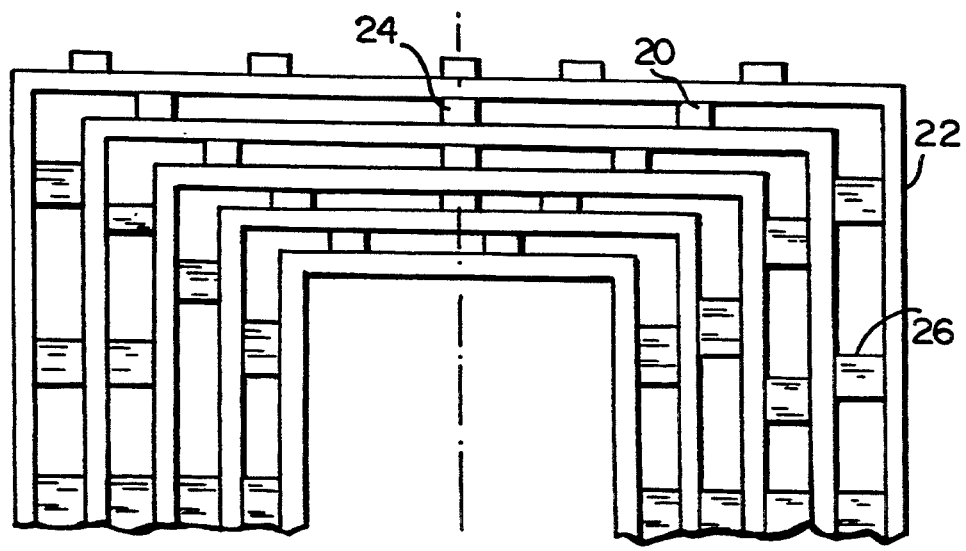
FIG. 2 is a schematic view of the end windings of the rotor of the dynamoelectric machine of FIG. 1 illustrating both axial and circumferential block assemblies between adjacent end windings.

Referring now to FIG. 2, there is illustrated a plurality of axially spaced end turns 20 and a plurality of generally circumferentially spaced conductor bar end windings 22. It will be appreciated that end turns 20 extend circumferentially about the rotor and are axially spaced one from the other, while the conductor bar end windings 22 lie parallel to the rotor axis and are circumferentially spaced from one another. In each case, the spacing between adjacent windings is maintained by conformable distance block assemblies according to the present invention. For example, to maintain the spacing between the end turns 20, there is provided axial conformable distance block assemblies 24 and to maintain the circumferential spacing between the conductor bars 22, there is provided circumferential distance block assemblies 26. It will be appreciated that the end windings comprise stacked laminations of copper bars and that the distance block assemblies extend substantially the full height of the stacked laminated bars.

Referring now to FIG. 6, there is illustrated an axial conformable distance block assembly 24 which comprises a pair of generally rectilinear blocks 28 formed of an electrically insulating hard material such as glass. As illustrated in FIG. 3, each block 28 of the axial block assemblies 24 has generally parallel side faces 30. To form the axial block assemblies 24, a pair of rectilinear blocks 28 are disposed on opposite sides of a spacer 32 formed of a deformable material. The deformable material is preferably electrically non-conductive and resilient, such that when compressed, it will have a tendency to return to its original uncompressed condition. An example of such material is a dacron felt. As illustrated in FIG. 6, the blocks 28 straddle the spacer 32 to form a block assembly of a predetermined thickness for disposition between adjacent end turns 20 of the end windings. To secure the blocks in assembly and also to secure the assembly to the end windings, a tape 34 having an adhesive along an inside face thereof is wound about the block assembly. The tape 34 is an electrically insulating tape formed of a strong, durable, heat-resistant material such as Kevlar. The tape is wound about the assembly, preferably for only a single turn, and left with a projecting tab 36.

Referring now to FIG. 7, there is illustrated a circumferential conformable distance block assembly 26 comprised of a pair of blocks 38 formed of similar materials as block 28. In this instance, however, the blocks 38 are tapered along at least one outer surface 40. Accordingly, when the blocks 38 are disposed on opposite sides of a spacer 32, a generally wedge-shaped circumferential block assembly 26 is formed. That is, the blocks 38 are arranged in straddling relation to the spacer 32 such that there is provided a smaller interior (radially innermost) thickness dimension 44 when installed in the dynamoelectric machine as compared with the larger opposite (radially outermost) thickness dimension 46. As with the axial block assembly, a tape 48 is wrapped around the blocks 38 and spacer 32, leaving a tab 50, the tape having adhesive along an interior face thereof for holding the block and spacer in assembled condition.

Referring to FIG. 5, there is illustrated a plurality of deformable spacers of various and different thicknesses. Each spacer has a generally rectilinear configuration, having a predetermined thickness. For example, spacers may be provided in thicknesses of $\frac{1}{8}$, $\frac{1}{4}$, $\frac{3}{8}$ inches, etc., such that an installer has available a plurality of spacers of various thicknesses from which to select one or more spacers for use in conjunction with one or the other of the block assemblies. The installer thus selects a spacer of the appropriate thickness or two or more spacers of appropriate thickness when combined in a block assembly to provide a block assembly having a thickness corresponding to the spacing between the adjacent end windings. Further, each spacer may be impregnated with a resin. For example, a time-curable or heat-curable resin may be provided each spacer such that, after installation, the resin may cure or be cured to form with the blocks a solid distance block assembly to maintain the predetermined spacing between adjacent end windings.

Figure 8:
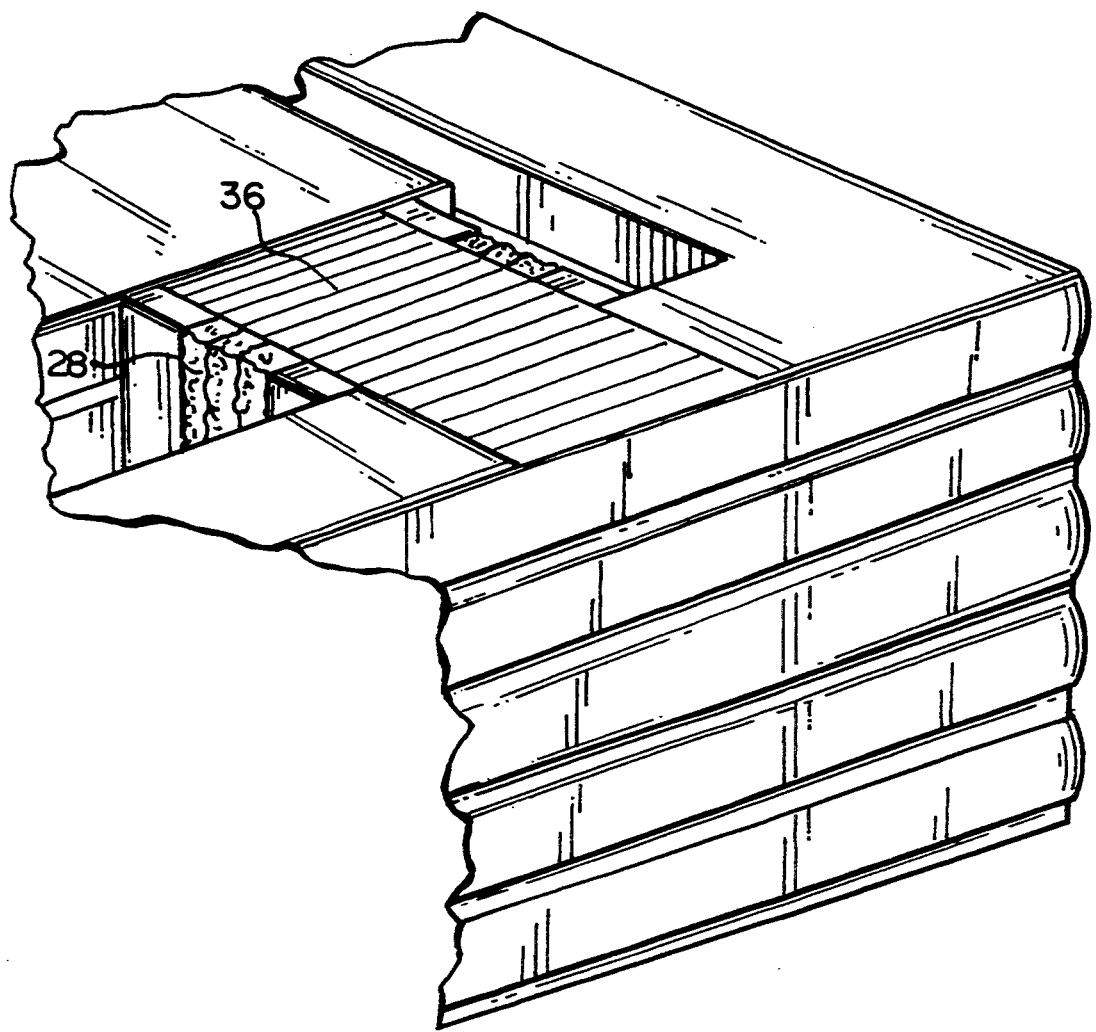
FIG. 8 is a fragmentary perspective view of the end windings with a distance block assembly according to the present invention disposed between an adjacent pair of such end windings.

To install the distance block assemblies of the present is invention, the installer selects one or more spacers in accordance with the distance between adjacent end windings in which the block assembly will be located. The installer then disposes the selected one or more spacers between the hard blocks 28 or 38 (see FIGS. 3 and 4), depending upon whether the block assembly forms an axial or circumferential block assembly. The assembly is then wrapped with the tape, leaving the free end tab of the tape for securement to an end winding. By manual squeezing the block assembly, thereby deforming the spacer, the installer locates the block assembly between the adjacent end windings in the appropriate location. The deformable spacer preferably has an elastic memory which tends to urge the individual blocks of the assembly outwardly into engagement with the walls of the stacked laminations of the end windings, as illustrated in FIG. 8. With the block assembly disposed between the adjacent end windings, the tab of the tape is secured over one of the end windings. In the case of the axial distance block assemblies 24, the tab prevents the distance block assembly from displacement in a circumferential direction, while in the case of the circumferential block assembly 26, the tab on the tape prevents movement of the block assembly in an axial direction. The insulation and retaining rings for the dynamoelectric machine preclude radial outward movement of the block assemblies.

Depending upon the type of resin used, the resin is cured in place forming solid block assemblies in situ. For example, where a heat-curable resin is used, heat may be applied to the installed spacer assemblies, for example, when the dynamoelectric machines are disposed in an oven upon manufacture at the factory.

Additionally, the axially spaced circumferential blocks may be coupled to one another to provide positive spacings therebetween. For example, a rigid tie bar may be disposed between the circumferential blocks to assist in maintaining positive axial spacing between the circumferential blocks and prevent axial movement thereof, for example, due to differential growth of adjacent conductor bars of the end windings.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a dynamoelectric machine having a rotor with an axis of rotation and end windings, a plurality of conformable distance block assemblies for spacing the end windings relative to one another, thereby defining a space between adjacent end windings, each said distance block assembly including at least one block formed of an electrically insulating solid material and a spacer disposed on one side of said block and formed of a deformable material, said assembly being located between adjacent end windings of said rotor with the deformable material conformed to fit the spacer and said one block to the space between said adjacent end windings, said end windings including axially spaced end turns having a circumferential extent, a portion of said distance block assemblies being disposed between said axially spaced end turns of said end windings with the blocks thereof having a constant thickness in an axial direction, said end windings further including conductor bars extending generally axially and parallel to one another and being circumferentially spaced from one another, another portion of said distance block assemblies spacing the conductor bars from one another, said one block of said another portion of said distance block assemblies having a generally wedge shape and having a small edge dimension radially inwardly of a larger opposite edge dimension thereof.

2. The dynamoelectric machine according to claim 1 including a tape about each said assembly and having a portion of said tape overlying an end winding for securing the assembly thereto.

3. The dynamoelectric machine according to claim 1 wherein each said spacer is formed of a material having a curable resin impregnated therein whereby, when the resin is cured, each block of each distance block assembly is conformed to fit between adjacent end windings.

4. The dynamoelectric machine according to claim 1 wherein said spacer is formed of a dacron felt material.

* * * * *